United States Patent [19]

Babcock et al.

[11] Patent Number: 5,304,709

[45] Date of Patent: * Apr. 19, 1994

[54] HAZARDOUS WAST DISPOSAL METHOD AND COMPOSITION

[75] Inventors: H. Nash Babcock, Old Greenwich; Edward Holub, Trumbull, both of Conn.

[73] Assignee: Nomix Corporation, Fairfield, Conn.

[*] Notice: The portion of the term of this patent subsequent to Mar. 22, 2005 has been disclaimed.

[21] Appl. No.: 662,470

[22] Filed: Feb. 28, 1991

Related U.S. Application Data

[60] Continuation-in-part of Ser. No. 518,040, May 2, 1990, which is a continuation of Ser. No. 199,556, May 27, 1988, Pat. No. 5,108,790, which is a continuation-in-part of Ser. No. 101,908, Sep. 28, 1987, Pat. No. 4,839,115, which is a division of Ser. No. 53,561, May 21, 1987, Pat. No. 4,732,782, which is a continuation-in-part of Ser. No. 843,316, Mar. 24, 1986, abandoned, said Ser. No. 518,040, is a continuation-in-part of Ser. No. 168,715, Mar. 16, 1988, Pat. No. 5,219,222, which is a continuation-in-part of Ser. No. 53,561, May 21, 1987, Pat. No. 4,732,782, which is a continuation-in-part of Ser. No. 843,316, Mar. 24, 1986, abandoned, which is a continuation-in-part of Ser. No. 49,906, May 15, 1987, Pat. No. 4,747,878, which is a division of Ser. No. 843,316, Mar. 24, 1986, abandoned.

[51] Int. Cl.$^5$ ............... C04B 18/04; C04B 18/18
[52] U.S. Cl. ................... 588/257; 588/252; 588/256; 106/697; 501/155; 405/128
[58] Field of Search ............ 106/697, 407, 690, 692, 106/713, 737, 802; 501/149, 155; 588/252, 256, 257; 405/128

[56] References Cited

U.S. PATENT DOCUMENTS

| | | | |
|---|---|---|---|
| H660 | 8/1989 | Tallent et al. | 106/607 |
| 4,116,705 | 9/1978 | Chappell | 106/697 |
| 4,432,666 | 2/1984 | Frey et al. | 106/640 |
| 4,514,307 | 4/1985 | Chestnut et al. | 106/697 |
| 4,518,508 | 5/1985 | Conner | 252/631 |
| 4,650,590 | 3/1987 | Beall | 210/751 |
| 4,732,782 | 3/1988 | Babcock et al. | 427/427 |
| 4,741,776 | 5/1988 | Bye et al. | 106/751 |
| 4,909,849 | 3/1990 | Funderbunk | 106/724 |
| 4,931,192 | 6/1990 | Covington et al. | 166/697 |

*Primary Examiner*—Mark L. Bell
*Assistant Examiner*—Michael Marcheschi
*Attorney, Agent, or Firm*—Weingram & Zall

[57] ABSTRACT

A method of immobilizing a hazardous waste is provided. The method comprises providing a dry cementitious composition capable of hardening and in the form of finely divided particles of at least one cement binder, placing an amount of the dry cementitious composition into the hazardous waste with or without an additional added volume of water, without any type of physical mixing of the cementitious composition and water other than the mixing which occurs merely by applying the cementitious composition into the water. The major portion of the particles of the cementitious composition have approximately the same drop rate through the volume of water. The water contacts the dry cementitious composition when poured into the volume of water to hydrate the particles of the dry cementitious composition, the particles of cementitious composition dropping through the water to displace excess water and form the hydrated cementitious composition particles in a substantially non-segregated mass. The hydrated cementitious composition is then allowed to set and cure to a solid mass. The set time may vary from less than a few seconds to many hours and even days to immobilize the hazardous waste. The cementitious composition may have a neutralizer for the hazardous waste.

27 Claims, No Drawings

HAZARDOUS WAST DISPOSAL METHOD AND COMPOSITION

RELATED APPLICATIONS

This application is a continuation-in-part of U.S. Ser. No. 07/518,040 filed May 2, 1990, now pending which is a continuing application of U.S. Ser. No 07/199,556 filed May 27, 1988, now U.S. Pat. No. 5,108,790, which is a continuation-in-part of U.S. Ser. No. 07/101,908 filed Sep. 28, 1987, now U.S. Pat. No. 4,839,115, which is a divisional of U.S. patent Ser. No. 07/053,561 filed May 21, 1987, now U.S. Pat. No. 4,732,782, which is a continuation-in-part of U.S. Ser. No. 06/843,316 filed Mar. 24, 1986, now abandoned. U.S. Ser. No 07/518,040 is also a continuation-in-part of U.S. Ser. No. 07/168,715 filed Mar. 16, 1988, now U.S. Pat. No.; 5,219,222, which is (a) a continuation-in-part of application U.S. Ser. No. 07/053,561, filed May 21, 1987, now U.S. Pat. No. 4,732,782, which is a continuation-in-part of U.S. Ser. No. 06/843,316, filed Mar. 24, 1986, now abandoned; and (b) a continuation-in-part of U.S. Ser. No. 07/049,906, filed May 15, 1987, now U.S. Pat. No. 4,747,878, which is a division of U.S. Ser. No. 07/843,316 filed Mar. 24, 1986, now abandoned. All of the foregoing applications and patents are incorporated herein by reference.

BACKGROUND OF THE INVENTION

1. Field of the Invention

This invention relates to the treatment of hazardous waste produced by industry, and preferably liquid hazardous wastes.

2. Prior Art

One of the most desirable ways of disposing of hazardous waste chemicals, e.g. radioactive waste, carcinogenic waste, etc., and reducing hazards to acceptable levels, is to solidify such chemicals. Many studies have been made on mixing such hazardous materials with concrete composed of cement, sand and gravel and sometimes other additives to make a solid mass. Such a method poses problems in contamination of the mixing vehicles, spillage and ventilation problems. Additional methods used are to build containers of concrete, steel, glass and combinations thereof to contain such chemicals for an indefinite period. Such methods have proven to have unacceptably high failure rates. To date, concrete encasement is probably the best method. Concrete, however, as presently used in industry has a high percentage of water of hydration leaving little opportunity for the cement fraction to absorb the excess hazardous liquids to immobilize the waste therein, i.e. the high percentage of the water of hydration uses up most of the concrete's ability to absorb liquid.

It is a common practice to process liquid hazardous or radioactive materials by adding absorbants in an attempt to simplify handling and transportation as well as eventual storage thereof. The materials that have been used heretofore include diatomaceous earth, vermiculite or expanded mica such as zonolite and krolite, Portland and Gypsum cements, as well as clay materials such as calcium bentonites. The problem with such materials is that only a relatively small amount of liquid can be absorbed or otherwise treated with less than satisfactory results and complicated mixing equipment is required which becomes contaminated. For example, liquid materials may be transported and disposed of in fifty-five gallon drums. However, it has been found that with the use of these absorbants, solid compositions cannot be achieved or if temporarily achieved, liquid separation occurs during transportation or storage. Any separated or free standing liquids are especially undesirable because of the potential danger of leakage from a ruptured or open container.

The following patents are relevant hereto:

| U.S. Pat. No. | Inventor |
| --- | --- |
| 3,983,050 | Mecham |
| 4,116,705 | Chappell |
| 4,174,293 | Colombo, et al |
| 4,775,494 | Rowsell et al. |
| 4,855,083 | Kagawa et al. |
| 4,913,835 | Mandel et al. |

Mecham (U.S. Pat. No. 3,983,050) describes the use of dry cement powder which is added to a metal canister containing dry radioactive calcined wastes so that the cement powder is in contact with the inner surface of the wall of the canister before the canister is sealed. If the container wall fails moisture from the environment contacts the cement and solidifies the cement to thereby seal the wall. In an embodiment the cement is mixed with the dry waste and placed in the metal canister.

Chappell (U.S. Pat. No. 4,116,705) describes a process which comprises treating hazardous waste with (i) an aluminum silicate or an aluminosilicate and (ii) a Portland cement, in the presence of water to form a slurry and allowing the slurry to set into rock and a crystal matrix having encapsulated therein the hazardous waste.

Rowsell et al., (U.S. Pat. No. 4,775,494) discloses the concept of disposing of radioactive or hazardous liquid waste by placing the liquid in a container and adding sodium montmorillonite over intervals until the composition is substantially solid in the container.

Colombo et al. (U.S. Pat. No. 4,174,293) describes a process for disposing of aqueous waste solutions by dispersing the solution in situ throughout a mass of powdered Portland cement in a container, curing the cement and thereafter impregnating the cured cement with a mixture of a monomer and polymerization catalyst and polymerizing the monomer. The container is then appropriately stored.

Kagawa et al. (U.S. Pat. No. 4,855,083) describes a solidifying agent comprising slag dust, silicates, water-soluble, high molecular weight compounds, metal salts of an organic acid and calcium carbonate. The solidifying agent is mixed with organic halogenides, such as PCB, to form solid composites which are subsequently burned.

Mandell et al. (U.S. Pat. No. 4,913,835) teaches spraying a particulate composition containing an organic acid neutralizing agent on a hazardous alkali spill.

Still further, at present, it is generally essential that a cementitious composition is mixed with water before placement in order to moisten the cementitious particles for the start of hydration and lock in place the hazardous waste. Generally, some type of mixing is required. Some manufacturers of premixes, usually in a container having instructions thereon, have put a dry premix cementitious composition in a hole or container and then recommended adding the water on top or through tubes. Some manufacturers have put premixes in bags and dropped the mixes, while in bags, through the water, then after the bags are in place, letting water penetrate through the bag to the mix. However, these systems do not permit full hydration of the cementitious composition. Mortar mixers, concrete mixers and hand mixing have been utilized to obtain a uniform distribution of the appropriate amount of water in the cement. According to the prior art, the quantity of water to be mixed with the cement must be controlled to a very narrow range, and too little or too much water will produce an ineffective or unusable material. Cementitious mixtures could not be placed in a dry state directly into water or on to a wet surface without first wetting and mixing the dry components with water.

In summary, solidification of waste materials with cementitious compositions is known, however, such is accomplished by either mixing the waste material with the cementitious composition to obtain essentially complete hydration or adding the liquid to the cementitious composition with or without mixing. There is no teaching or suggestion in the art of adding the cementitious composition to the hazardous waste without mixing to produce a solidified mass.

OBJECTS AND SUMMARY OF THE INVENTION

It is an object of this invention to provide a method of solidifying hazardous waste compositions so that when transported or buried, they will not be environmentally hazardous.

A method is provided for immobilizing hazardous waste comprising:

providing a dry, optionally fast setting, cementitious composition, the cementitious composition having a set time and in the form of finely divided particles of at least one cement binder;

providing a volume of water containing an amount of hazardous waste; and placing, e.g. an amount of dry cementitious composition into the volume of water. Preferably the volume of water being greater than the amount necessary for hydration of the amount of the cementitious composition. The water contacts the particles of the cementitious composition and hydrates the particles.

The major portion of the particles of the cementitious composition have approximately the same drop rate through the volume of water, allowing the cementitious composition to drop through the water, displacing the excess water as a result of the dropping of the cementitious composition. The hydrated cementitious composition is then allowed to form into a cured substantially non-segregated mass immobilizing the amount of hazardous waste.

What we have discovered is that by using dry cementitious formulas with or without aggregate of all sizes, with or without additives for various functions (e.g. increasing impermeability, strength, absorption control or drop rate) by pumping, blowing and pouring through liquid hazardous waste (which may or may not have been modified or diluted) we can form a solid mass which immobilizes the hazardous waste for reasonable, safe disposal and transportation.

Using such a dry cementitious mixture, the cement, with or without additional absorbants or with or without the addition of neutralizing chemicals, can increase multi-fold the amount of chemicals that can be absorbed and solidified on a unit volume basis. The method may be applied to small volumes of chemicals as well as multi-tons of chemicals in open pits. Additive chemicals and/or neutralizers that allow the dry system to hydrate the liquid waste can be added to either the dry cementitious portion or the liquid chemical portion.

The dry cementitious composition has finely divided particles of at least one cement binder. The composition is usually in a container, e.g. a bag having instructions associated therewith. The cement may be Portland cement, gypsum, high aluminum cement, or mixtures thereof, but is not restricted thereto. Magnesium phosphate or other fast-setting compounds may also be used. The major proportion of particles have approximately the same drop rate in water, so that when poured through water containing the hazardous waste the material does not appreciably segregate.

The cementitious composition may further include a filler component of sand or aggregate particles or a combination thereof, provided that the major portion of those particles have a drop rate in water containing the hazardous waste which is approximately the same as the cement particles. Also, the cementitious mixture should be able to absorb and/or combine with water in the amount approximately 50% by volume. The higher the amount of water the cementitious mixture can tolerate, the better the final product.

It is possible to use other additives in the cementitious compositions. Such additives may include, but are not limited to, accelerators, water reducing compounds, waterproofing agents, polymers, drying shrinkage inhibitors, wet shrinkage inhibitors, lime, pigments and the like, and may be added to improve or impart a particular property to the composition. A preferred additive is a "neutralizer" for the hazardous waste. By the use of the term "neutralizer" herein it is meant a compound or composition which converts the hazardous waste to a substantially less hazardous waste and/or prevents substantial leakage of the waste from the solidified cementitious composition.

This improved method of treating hazardous waste materials can be utilized by placing the water and hazardous waste in a fifty-five gallon drum and then by treating by the above procedure. Optionally lagoons, ponds, e.g. settling ponds may be so treated. The resulting composition may be handled, transported, and stored under a variety of conditions for extended periods of time without evidence of liquid separation or deterioration or leakage. These and other advantages will be more particularly described in the following detailed description.

DETAILED DESCRIPTION OF THE PREFERRED EMBODIMENTS

This invention relates to dry cementitious compositions which are poured, trowled, tremied (elephant trunk) or sprayed through excess water or onto wet surfaces, said water containing a hazardous waste, without mixing, to hydrate the cement component and obtain solidified products after setting and curing which have immobilized therein the hazardous waste. Cementitious compositions of Portland cements, gypsums, high alumina cements, other specialty cements and combinations, as well as other chemicals such as magnesium phosphates, all can be successfully used, the only limitation being that at least one component of the cementitious composition is hydrated by or reacts with water.

The method of solidifying and immobilizing the hazardous liquid waste compositions according to this invention may be applied to a great variety of such materials. For example, in the radioactive waste disposal field, liquids which must be treated and disposed of include reactor plant liquid such as turbine, cutting and lubricating oils, solvent sludges which are used to decrease the reactor components such as Freon TF, cleaning solvents such as Stoddard solvents, decontamination solvents and aqueous mixtures of the above noted hydrocarbon materials, particularly those containing between from five to about seventy-five percent hydrocarbons and even up to one hundred percent hydrocarbons. In addition a great quantity of such wastes are aqueous liquids containing over about ninety-five percent water contaminated with a radioactive material, such as grease from reactor plant turbines. Hospital sourced contaminated liquids contain radioactive materials used in cancer treatments. From such sources, particularly common materials include the radioactive cobalts such as cobalt 57, cobalt 58, and cobalt 60, cesium, plutonium and uranium isotopes, and the like. However, it is to be understood according to this invention, that any radioactive waste materials may be treated according to the method of this invention.

Other common hazardous waste materials include acids, bases, chlorinated hydrocarbons including PCB, dioxins, and the like. Again, these as well as the radioactive materials may be in substantially aqueous liquids, particularly those having ninety-five percent or more water, or they may be in aqueous mixtures containing substantial amounts of hydrocarbons.

The hazardous waste may also contain aluminum, boron, cadmium, chromium, copper, iron, lead, manganese, nickel, tin, zinc, arsenic, antimony, barium, cobalt, gallium, hafnium, mercury, molybdenum, niobium, strontium, tantalum, thorium, titanium, vanadium, zirconium, selenium, or silver or a compound of any of the elements. It may contain anions such as fluoride, sulphate, phosphate, nitrate, nitrite, sulphite, cyanide, sulphide, thiocyanate, thiosulfate, potassium ferricyanide or ferrocyanide and it may contain an acid, alkali, protein, carbohydrate, fat, drug, Prussian or Turnbulls blue, detergent, mineral oil, tar or grease.

Other examples of wastes which may be treated by this invention are:

Mining and Metallurgy Wastes e.g. mine tailings, drosses, especially those containing As, Cd, Cr, Cu, CN, Pb, Hg, Se, Zn or Sb; Paint Wastes, paint wastes stripped of solvent produced by heavy industry; Sulphide Dye Liquors; Inorganic Catalysts used in a wide range of industry e.g. petrochemical, general chemical or dyestuff industries; Electrical and Electronic Industry Wastes such as printed circuit wastes; Printing and Duplicating Wastes; Electroplating and Metal Finishing Wastes; Explosives Industry Wastes; Latex Wastes and cyanide, mercury and zinc waste produced by the rubber and plastics industry; Electric Battery production wastes; Textile wastes; Cyanide, arsenic, chromium or other inorganic waste produced by the petrochemical industry; Leaded Petrol Sludges; Pulp and Paper Industry Wastes; Leather Industry Wastes; Inorganic sludges produced by general chemical industry; Asbestos Waste; Scrubbing Liquors from incinerators and gas cleaning equipment; Silts and dredgings from waterways; Spent Oxides for gas purification; Cement and Lime Industry Wastes, such as dusts collecting in electrostatic precipitators; Cyanide Case Hardening Wastes; Incineration Ashers e.g. fuel oil ashes from burning fuel oil in power stations, ash from burning domestic refuse and sewage sludge, etc.; Sewage Sludges; Smelting and Metal Refining Industry Wastes e.g. from metal smelting and refining, e.g. aluminum, zinc, copper or lead; Iron and Steel Industry Wastes; Sulphide Wastes e.g. calcium or sodium sulphide; and Acid and Alkaline Wastes.

As stated previously, it is preferred to use a "neutralizer" for the hazardous waste as an additive to the cementitious composition, although this invention also contemplates the addition of this "neutralizer" to the hazardous waste.

This invention is not limited to the waste substances and "neutralizers" or combinations thereof previously mentioned.

By the use of the term "neutralizer" herein it is meant a compound or composition which converts the hazardous waste to a substantially non-hazardous waste and/or prevents substantial leakage of the waste from the solidified cementitious composition.

The specific neutralizer and amounts used is highly dependent on the type of hazardous waste. Specific neutralizers and effective amounts thereof for specific hazardous wastes are as follows:

| Hazardous Waste | Neutralizer | Effective Amount |
| --- | --- | --- |
| Barium | $K_2SO_4$ and Fumed Silica | Total neutralizer(s) is present in at least the stoichmetric equivalent weight of the hazardous waste. |
| Mercury | Sulfur and Fumed Silica | |
| Nickel | $Na_2CO_3$ and Fumed Silica | |
| Phenylenediamine | Resorcinol and $Ca(OH)_2$ | |
| Phenol | Vinyl Acetate-Ethylene Copolymer | |
| Lead | Lumnite Cement (HAC) | |
| Mercury | Sulfur and Fumed Silica | |

Fast setting cementitious compositions can be used. By the use of the term "fast setting" herein it is meant a cementitious composition which sets faster than the most common Portland cement, i.e., type I or type II.

By the use of the term "cement binder" herein it is meant is a material, usually of a cementitious nature, which sets or cures upon contact with water by hydration to form a solid mass which is useful for forming blocks, shapes, structures, walls, floors, or other surfaces for use as a supporting or load bearing member. The cement binder may be used alone or with various additives and fillers, usually sand or aggregate, to form the desired member after setting and curing. In addition to the well known cement binders, such as Portland cement, modified Portland cement, aluminous cement, gypsum and its variations, magnesium phosphate cements and the like, other materials, such as the silicates, are also contemplated as being within the scope of this term since they perform in a manner similar to the cements. Aluminum silicate is a specific example of this type material, and it is used for specialty applications due to its relatively high cost compared to the other cement materials previously mentioned. Other specialty cements may be utilized.

When the formulations of these cementitious compositions are properly controlled, the problems of thorough wetting of the cement without overwetting, of segregation of components, and of loss of compressive strength of the cured product are greatly reduced or eliminated.

Where cement coatings are desired, the surface area to be coated is first pre-wetted and saturated with water containing the hazardous waste. The dry cementitious mixture is placed on the surface, instantly reacting with the wet surface. If additional layers or a greater thickness of the coating is needed, the first cement layer can be pre-wetted and the dry composition sprayed directly thereupon to increase the thickness and structural strength of the overall coating.

On horizontal surfaces, which may or may not have a hazardous waste thereon, the area to be poured with cement is flooded with water containing a hazardous waste, then the dry cementitious compositions of the invention can be poured into the water. The excess water is displaced by the cementitious composition, and the composition is then allowed to cure immobilizing the hazardous waste therein. This provides a fast, simple immobilization of the hazardous waste with cement without the need for tools, mixing apparatus, water measurement aids or the like.

Controlling the rate of hydration may lead to many applications. For instance, for coating vertical surfaces, a very fast setting cementitious composition can be used to eliminate the problems of running, sagging or failure to bond. For situations where the surface particles have not been properly wetted, additional water may be applied to the surface for more activation and further finishing. Preferred set times for immobilizing hazardous waste are less than about 10 minutes and, where desirable less than about 5 minutes, with longer set times preferred for larger volumes of liquid. It may also be desirable to provide for "long" set times, e.g. over one day to minimize the heat of hydration, to obtain more complete reaction to enhance the formation of a monolithic structure or for long installation requirements.

In the past, there has always been difficulty in controlling the amount of water for immobilizing hazardous waste. This problem is solved by this invention because the amount of water is controlled by the formulation of the dry cementitious composition itself. For example, water containing the hazardous waste can be placed a container, e.g. drum, and then the dry cementitious material may be placed therein by pouring, spraying, or screening into the container until the desired level is reached. The rate of setting of the cementitious mixture can be designed to meet the needs of the particular application. The amount of water required depends on the specific composition and application used.

In certain circumstances, a cavity, e.g. waste disposal pit, could have a small amount of water placed into it and then the first part of the cementitious mixture placed into the water. While this placement is taking place, additional water containing hazardous waste could then be placed into the hole by various methods simultaneously with the placement of the rest of the cementitious mixture. When the final quantity of the cementitious mixture is reached, the entire surface area could be sprayed for trowling or other finishing purposes as could be done when the entire mixture is poured through water.

In the situation where the cavity or container is porous and cannot hold water, it is possible to thoroughly wet the surfaces of the cavity and then introduce a fast setting cementitious mixture to partially seal the surfaces of the hole to retain water. It is then possible to pour the water containing the hazardous waste into the lined container and proceed as discussed above.

The control of density and size of the dry components and the rate of drop through water is essential for the proper performance of the cementitious mixtures. The ability to use materials of various sizes and densities, whose drop rate would otherwise be higher if a slow setting cementitious mixture was used, is enhanced by the increased rate of the water activation of the cementitious particles to form a homogeneous mixture.

The use of specific cementitious compositions may be varied or adjusted to meet the needs of the particular application. The most ideal situation is to balance the drop rate for all the dry ingredients and to control the setting time of the cement so that all particles will be properly hydrated and integrated with the aggregates, if any. The setting time of the binders can be accelerated to a few seconds or slowed up for days, depending upon the selection of cement component.

In some compositions, no curing agent is required. Furthermore, the compositions may contain numerous chemicals or additives that are compatible to the system for the purpose of improving or imparting certain properties. Additives such as accelerators, water reducers, bonding agents, curing agents, or pumping or waterproofing aids may be added to the compositions of the invention. These additives or modifying agents can be added to the water or to the cement mix, in any order or combination.

If aggregates are found to be too heavy, smaller aggregates or lighter weight aggregates can be used to keep the density of the overall system in balance.

The present invention provides the following:
1. Dry cement can be used.
2. Cement and sand can be used.
3. Cement, sand and aggregates can be used.
4. All types of cements can be used.
5 All types of cementitious particles, such as gypsums, limes and so forth can be used.
6. All types of chemical cements, even with water soluble parts, can be used.
7. No wet mixing or blending equipment is required.
8. No addition of water to cementitious mixes is required before placement, thus avoiding clean up of equipment and waste.
9. When placements under deep water conditions where tremes, elephant trunks or pipes would be required, the material herein can be placed dry in the tube and activated by available water at the end of the line, thus keeping all conveyances clear of wet cement or contaminated water. too low in mixtures to prevent
10. When cement contents are proper strength development or prevent over-absorption of water, resulting in weak or segregated mixes, more cement may be added, or water absorption material may be added, to prevent excess water from decreasing the quality of the mix.

Cement mixes which are too low in absorbent capacity should have some additional water absorption agent in the mix to prevent overwatering and segregation. Ideally, cementitious compositions of the mixtures should have the maximum amount of water absorbency possible. The higher the ratio of chemical bonded water to the binder, the better and more versatile a product will be achieved.

Cementitious mixtures containing about 20 percent by weight cement may or may not need additional cements or water absorbers, depending on the application. Generally, at least 35 percent by weight of a cement binder is preferred for use in the composition and methods of this invention.

The cement composition can be altered with any of a multitude of cement binders including, but not limited to, Portland cement, magnesium phosphate cement, magnesium cement, high aluminous cement and other cementitious compositions whether totally cement binder and/or Portland cement binder and/or polymers. These compositions are then poured into the liquid waste and left to hydrate and solidify. These solidifications can take place in minutes, hours or days depending on conditions. A deep pour of a dry cementitious composition may be done in layers or in mass, by pouring slowly, with the required set times determined by the situation.

In many cases some of these hazardous waste chemicals can be solidified by merely diluting with water and/or additives in order for the cementitious binder to hydrate into a solid mass using up the waste chemicals.

These solidified wastes, if properly formulated, can be used for foundations and many other building functions provided leaching of radioactive or otherwise harmful materials is controlled by using impermeable cementitious mixtures, waterproofing coatings, radiation shielding, impermeable coatings, and certain chemical coatings that would not react with the basic mass.

There are an indeterminate number of waste chemical compositions and job conditions which must be handled. Each situation must be analyzed carefully, but the principle of using a cementitious binder in the dry state and pouring it into the container of whatever size or into the spillage area of whatever coverage and solidifying the harmful waste into an acceptable mass for disposal is the most effective way known today to rapidly eliminate hazardous liquid waste situations.

The same method may be used to dispose of solid hazardous wastes, e.g. radioactive solids (for example, metal or concrete parts). This may be accomplished by encasing these solid hazardous waste materials in a container, covering them with water and pouring the specially adjusted cementitious compositions through water to solidify the mass.

For situations where the radioactivity is extremely strong or the fumes or chemicals particularly hazardous, the cementitious composition can be modified to contain the additives, i.e. neutralizers, necessary to modify the chemicals so that they would react to form a solid mass with the cementitious composition, which can be then blown or pumped dry into the liquid waste from a safe distance without injuring individuals or causing unnecessary pollution to mixing equipment. The encased end of the blowing or pumping unit can be cut off and forms a part of the encasement or solidification.

The solidified composition produced according to this invention may be used for example, for landfill, hardcore, in the manufacture of constructional materials, in the preparation of grout, for the encapsulation of other wastes such as domestic refuse, or in land reclamation from diffused mines, quarries, excavations, lakes, estuaries and the sea. Domestic wastes which do not lend themselves to the process of the invention may however, be buried in a mass of the slurry or rock and this will overcome the hazards of odor and rodents often associated with their disposal.

While using liquids other than water, such as two component thermosetting organic compounds, an aggregate or sand can be dropped through the liquid or chemicals, causing the final mixture to be blended by gravity or by the solid ingredients passing through the liquid, which will result in a hardened mass of aggregate or sand and chemical.

EXAMPLES

The scope of the invention is further described with the following examples which illustrate preferred embodiments of the invention and which are not to be construed as limiting the scope of the invention.

In the examples that follow, the components of each cementitious composition were manufactured of finely divided particles having substantially the same drop rate in water, so that the advantages previously discussed could be achieved.

Example No. 1

IMMOBILIZATION BY SOLIDIFICATION OF A HAZARDOUS SOLUTE (BARIUM)

| DRY BLEND | |
|---|---|
| 70% | Lumnite Cement |
| 20% | $K_2SO_4$ |
| 10% | EMS - 960 Fumed Silica |

POURED DRY BLEND INTO WATER (CONTROL)

Poured dry blend into 3 cubes with 60 ml of water in each 2" cube mold.

| Cube # | Age | Psi |
|---|---|---|
| 1 | 3 Days | 250 |

Material absorbed all liquid without any spillage. Top surface sprayed.

POURED DRY BLEND INTO TEST SOLUTION (5% BARIUM ACETATE AND 95% WATER)

Poured dry blend into 3 cubes with 60 ml of Test Solution in each 2" cube mold.

| Cube # | Age | Psi |
|---|---|---|
| 1 | 3 Days | 250 |

Material absorbed all liquid without any spillage. Top surface sprayed.

Example No. 2

IMMOBILIZATION BY SOLIDIFICATION OF A HAZARDOUS SOLUTE (MERCURY)

| DRY BLEND | |
|---|---|
| 80% | Lumnite Cement |
| 20% | Sulfur |
| 10% | EMS - 960 Fumed Silica |

POURED DRY BLEND INTO WATER (CONTROL)

Poured dry blend into 2 cubes without 60 ml of water in each 2" cube mold.

| Cube # | Age | Psi |
|---|---|---|
| 1 | 4 Days | 675 |

Material appears hydrophobic. Material absorbed all liquid; top surface sprayed.

POURED DRY BLEND INTO TEST SOLUTION

Mercuric Chloride, a 5% Solution, 95% Water

Poured dry blend into 3 cubes with 60 ml of Test Solution in each 2" cube mold.

| Cube # | Age | Psi |
|---|---|---|
| 1 | 4 Days | 475 |

Hydrophobic material absorbed all liquid; top surface sprayed.

Example No. 3

IMMOBILIZATION BY SOLIDIFICATION OF A HAZARDOUS SOLUTE (NICKEL)

| DRY BLEND | |
|---|---|
| 80% | Lumnite Cement |
| 10% | Sodium Carbonate |
| 10% | EMS - 960 Fumed Silica |

POURED DRY BLEND INTO WATER (CONTROL)

Poured dry blend into 2 cubes with 60 ml of water in each 2" cube mold.

| Cube # | Age | Psi |
|---|---|---|
| 1 | 4 Days | 300 |

Material absorbed all liquid; top surface sprayed.

POURED DRY BLEND INTO TEST SOLUTION

Nickel Sulfate, a 5% Solution, 95% Water

Poured dry blend into 3 cubes with 60 ml of Test Solution in each 2" cube mold.

| Cube # | Age | Psi |
|---|---|---|
| 1 | 4 Days | 125 |

Material absorbed all liquid; top surface sprayed.

Example No. 4

IMMOBILIZATION BY SOLIDIFICATION OF A HAZARDOUS SOLUTE (PARA-PHENYLENEDIAMINE)

| DRY BLEND | |
|---|---|
| 68% | Portland Type II Cement |
| 2% | Resorcinol |
| 10% | Ca(OH)$_2$ |
| 20% | Fly Ash |

POURED DRY BLEND INTO WATER (CONTROL)

Poured dry blend into 2 cubes with 60 ml of water in each 2" cube mold.

| Cube # | Age | Psi |
|---|---|---|
| 1 | 4 Days | 225 |

Cube colores—yellow, red. Material absorbed all liquid; top surface sprayed.

POURED DRY BLEND INTO TEST SOLUTION

P-Phenylenediamine, a 1% Solution in 99% Water

Poured dry blend into 3 cubes with 60 ml of Test Solution in each 2" cube mold.

| Cube # | Age | Psi |
|---|---|---|
| 1 | 4 Days | 187 |

Cube colors—yellow, dark brown, reddish brown. Cement agglomerates would skate around on water surface during addition. Material absorbed all liquid; top surface sprayed.

While is apparent that the invention disclosed herein can fulfill the objects above stated, it will be appreciated that numerous modifications and embodiments may be devised by those skilled in the art, and it is intended that the appended claims cover all such modifications and embodiments as fall within the true spirit and scope of the present invention.

What is claimed is:

1. A method of immobilizing a hazardous waste comprising:

(a) providing a dry cementitous composition in the form of finely divided particles, the cementitious composition having a set time and including at least one cement binder;

(b) providing a volume of water containing an amount of hazardous waste;

(c) adding an amount of dry cementitious composition into the volume of water without any type of physical mixing of the cementitious composition and water other than the action which occurs merely by applying the cementitious composition into the water, the volume of water being greater than the amount necessary for hydration of the amount of the cementitious composition, the water contacts the particles of the cementitious composition and hydrate the particles, and the major portion of the particles of the cementitious composition have approximately the same drop rate through the volume of water;

(d) allowing the cementitious composition to drop through the water without any type of physical mixing of the cementitious composition and water other than the action which occurs merely by adding the cementitious composition into the water, displacing the excess water as a result of the dropping of the cementitious composition; and (e) allowing the hydrated cementitious composition to form into a cured substantially non-segregated mass immobilizing the amount of hazardous waste.

2. The method of claim 1, wherein the set time is over one day.

3. A method of immobilizing a hazardous waste comprising:

(a) providing a dry fast setting cementitious composition in the form of finely divided particles having a set time and including at least one cement binder;

(b) providing a volume of water containing an amount of a hazardous waste;

(c) adding an amount of dry cementitious composition into the volume of water without any type of physical mixing of the cementitious composition and water other than the mixing which occurs merely by applying the cementitious composition into the water;

the major portion of the particles of the cementitious composition have approximately the same drop rate through the volume of water, and the water contacts the dry cementitious composition when poured into the volume of water to hydrate the particles of the dry cementitious composition, the particles of cementitious composition dropping through the water without any type of physical mixing of the cementitious composition and water other than the action which occurs merely by applying the cementitious composition into the water, to displace excess water and form the hydrated cementitious composition particles in a substantially non-segregated mass; and (d) allowing the hydrated cementitious composition to set and cure to a solid mass for at least the set time to immobilize the hazardous waste.

4. A method of immobilizing hazardous waste comprising:

(a) providing a dry fast setting cementitious composition in a form of finely divided particles of at least one cement binder, the composition having a set time;

(b) providing a volume of water containing an amount of hazardous waste;

(c) adding an amount of the dry cementitious composition into the volume of water without any type of physical mixing of the cementitious composition and water other than the action which occurs merely by applying the cementitious composition into the water, the amount being less than an amount necessary for full hydration of the dry cementitious composition with the volume of water;

the major portion of the particles of the cementitious composition have approximately the same drop rate through the volume of water, so that the water contacting the particles of cementitious composition hydrates the particles as the particles drop through water;

(d) allowing the cementitious composition to drop through the water without any type of physical mixing of the cementitious composition and water other than the action which occurs merely by applying the cementitious composition into the water, displacing the excess water as a result of the dropping of the cementitious composition; and (e) allowing the hydrated cementitious composition to form into a cured substantially non-segregated mass to immobilize the hazardous waste.

5. The method of claim 1, wherein the set time is less than about ten minutes.

6. The method of claim 1, wherein the set time is about ten minutes.

7. The method of claim 1, wherein the set time is less than about five minutes.

8. The method of claim 1, wherein the set time is about five minutes.

9. The method of claim 1, wherein the cement binder is present in at least about 20 percent by weight of the composition of the cementitious composition.

10. The method of claim 1, wherein the cement binder is selected from the group consisting of Portland cement, modified Portland cement, gypsum, high aluminum cement, magnesium phosphate and combinations thereof.

11. The method of claim 1, wherein the composition further comprises an amount of a filler component in the form of particles, the major portion of which have approximately the same drop rate as the cement particles, to provide a mixture having at least about 35 percent by weight of cement binder.

12. The method of claim 10, wherein the filler component is selected from the group consisting of sand, aggregate, and mixtures thereof.

13. The method of claim 1, further comprising a filler component selected from the group consisting of sand and aggregate.

14. The method of claim 1, wherein the cementitious composition is dry blended to a homogenous consistency.

15. The method of claim 1, further comprising adding a sufficient amount of additional cement to absorb a portion of the excess water.

16. The method of claim 1, further comprising at least one component to impart a specific property to the composition, the component selected from the group consisting essentially of an accelerator, water reducing compound, pumping aid, water absorbing compound, water proofing agent, polymer, wet expansion inhibitor or drying shrinkage inhibitor.

17. The method of claim 1, wherein the cement binder is present in an amount of at least 35 percent by weight.

18. The method of claim 1, wherein the cementitious composition further comprises an effective amount of a neutralizer for the amount of hazardous waste.

19. The method of claim 18, wherein the neutralizer is potassium sulfate and the hazardous waste is barium cation.

20. The method of claim 18, wherein the neutralizer is sulfur and the hazardous waste is mercury.

21. The method of claim 18, wherein the neutralizer is sodium carbonate and the hazardous waste is nickel cation.

22. The method of claim 18, wherein the neutralizer comprises resorcinol and a base selected from the group consisting of an inorganic base and an organic base and the hazardous waste is a phenylenediamine.

23. The method of claim 18, wherein the neutralizer is vinyl acetate-ethylene copolymer and the hazardous waste is phenol.

24. The method of claim 18, wherein the neutralizer is HAC cement and the hazardous waste is lead cation.

25. The method of claim 1, wherein adding is pouring into the volume of water.

26. The method of claim 1, wherein adding is blowing into the volume of water.

27. The method of claim 1, wherein adding is pouring through a tremie into the volume of water.

* * * * *